United States Patent [19]

Hirasawa

[11] Patent Number: 4,897,674

[45] Date of Patent: Jan. 30, 1990

[54] LIQUID JET RECORDING HEAD

[75] Inventor: Shinichi Hirasawa, Kanagawa, Japan

[73] Assignee: Canon Kabushiki Kaisha, Tokyo, Japan

[21] Appl. No.: 256,119

[22] Filed: Oct. 11, 1988

Related U.S. Application Data

[63] Continuation of Ser. No. 942,809, Dec. 22, 1986, abandoned.

[30] Foreign Application Priority Data

Dec. 27, 1985 [JP] Japan ................................ 60-293320

[51] Int. Cl.[4] .......................... G01D 15/16; B41J 3/04

[52] U.S. Cl. ................................................ 346/140 R

[58] Field of Search .......................................... 346/140

[56] References Cited

U.S. PATENT DOCUMENTS

| | | | |
|---|---|---|---|
| 3,848,118 | 11/1974 | Rittberg | 346/140 X |
| 4,216,477 | 8/1980 | Matsuda | 346/140 |
| 4,284,996 | 8/1981 | Greve | 346/140 |
| 4,317,124 | 2/1982 | Shirato et al. | 346/140 R |
| 4,334,234 | 6/1982 | Shirato | 346/140 R |
| 4,394,670 | 7/1983 | Sugitani | 346/140 |
| 4,459,600 | 7/1984 | Sato | 346/140 |
| 4,475,113 | 10/1984 | Lee | 346/140 X |
| 4,587,534 | 5/1986 | Saito | 346/140 |
| 4,635,077 | 1/1987 | Itoh | 346/140 |
| 4,723,129 | 2/1988 | Endo | 346/140 X |
| 4,723,136 | 2/1988 | Suzumura | 346/140 |
| 4,752,787 | 6/1988 | Matsumoto | 346/140 |

FOREIGN PATENT DOCUMENTS

| | | |
|---|---|---|
| 2918737 | of 1979 | Japan . |
| 3005394 | of 1980 | Japan . |
| 55-100169 | 7/1980 | Japan . |
| 3012720 | of 1983 | Japan . |
| 3224081 | of 1983 | Japan . |
| 58-1569 | 6/1983 | Japan . |
| 58-1570 | 6/1983 | Japan . |

*Primary Examiner*—Joseph W. Hartary
*Attorney, Agent, or Firm*—Fitzpatrick, Cella, Harper & Scinto

[57] ABSTRACT

A liquid jet recording head having orifices for discharging liquid droplets therefrom, a liquid chamber for retaining liquid therein, and liquid flow paths connecting the orifices to the liquid chamber. The cross-sectional area of the flow paths gradually decreases from the liquid chamber toward the orifices. Also provided are an energy generating portion in the liquid flow paths and generating energy to be impared to the liquid, and small walls provided upstream of the energy generating portion, whereby the flow of the liquid from the liquid chamber to the energy generating portion is suppressed.

7 Claims, 3 Drawing Sheets

LIQUID JET RECORDING HEAD

This application is a continuation of application Ser. No. 942,809 filed Dec. 22, 1986, now abandoned.

BACKGROUND OF THE INVENTION

This invention relates to a liquid jet recording head, and more particularly to a liquid jet recording head used in an on-demand type liquid jet recording apparatus to discharge recording liquid and form flying liquid droplets.

2. Related Background Art

As an on-demand type liquid jet recording head, there is typically known one of the type in which a piezo-electric element, which is an electromechanical converting element or a magneto-strictive element is utilized to impart a sudden pressure force to the liquid in a discharge generating portion, thereby accomplishing discharge of liquid droplets. In a recording head of this type ink droplets can be discharged from orifices only when required for printing, and has the great merit that means for collecting unnecessary ink and a high voltage source for deflection are not required. On the other hand, a liquid jet recording head of this type has the disadvantage that the discharge repetition frequency is relatively low and therefore the printing speed is low, and also involves the problem that if the repetition frequency is increased, it becomes difficult for uniform droplets to be formed in a stable condition and this gives rise to an irregularity in the liquid droplet discharge speed which also makes stable recording difficult to obtain.

A method in which liquid acted by the heat energy creates a change of phase which results in a rapid increase in volume and in which liquid is jetted from an orifice is known as on-demand type liquid jet recording method (See DOLS-2843064).

A liquid jet recording head employing the above method enables implementation of a recording head of a full line type having a high density multiorifice head and can provide high quality image at a high speed.

However, further high speed printing and the further stability of the ink jet recording head have been recently required.

To solve such a problem, a liquid jet recording head has been proposed which, as disclosed, for example, in Japanese Laid-Open Patent Application Nos. 1569/1983 and 1570/1983, has orifices for discharging liquid and forming flying droplets and in which energy generating members generating energy for forming liquid droplets are provided in liquid paths for directing the liquid from a liquid chamber to the orifices and wherein the flow paths are formed so that the cross-sectional are thereof is gradually decreased from the liquid chamber toward the orifices.

However, the realization of the higher speed recording and the more stable recording in the ink jet recording head results in dense recording and the high grade recording and therefore the above requirements are always required.

In recent years, the requirements for higher performance of the ink jet recording apparatus, for example, higher printing speed and stable recording quality, have been increasing and recording heads of higher quality have been desired.

SUMMARY OF THE INVENTION

The present invention has been made in view of the above-noted requirements and an object thereof is to provide a liquid jet recording head of high reliability in which even if the repetition frequency is increased, uniform and stable discharge of liquid droplets is ensured and recording of high quality is obtained.

A further object of the present invention is to provide a liquid jet recording head which has orifices for discharging liquid therefrom and forming flying liquid droplets and in which energy generating members generating energy for forming liquid droplets are provided in liquid paths for directing the liquid from a liquid chamber to the orifices, the cross-sectional area of the flow paths being gradually decreased from the liquid chamber toward the orifices and small walls for suppressing the flow of the liquid from the energy generating members being disposed either in the flow paths which are more closely adjacent to the liquid chamber than to the energy generating members or in the liquid chamber.

DESCRIPTION OF THE PREFERRED EMBODIMENTS

Some embodiments of the present invention will hereinafter be described in detail with reference to the drawings.

Figure 1:
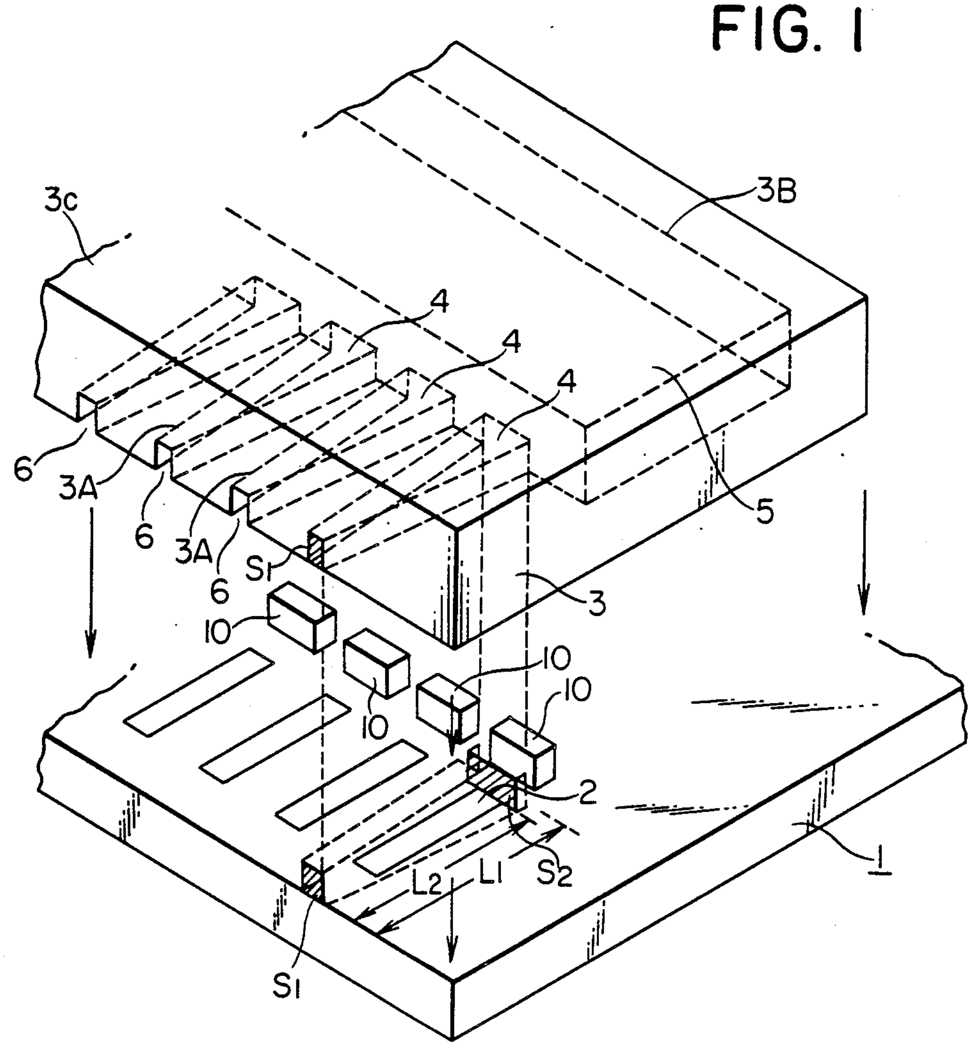
FIG. 1 is an exploded perspective view showing an example of the construction of the liquid jet recording head of the present invention.

Referring to FIG. 1 which shows an embodiment of the present invention, reference numeral 1 designates a substrate which may be formed of glass, ceramics, plastics or a metal. Reference numeral 2 denotes energy generating members disposed at predetermined intervals on the substrate 1, and on the other hand, a liquid path forming member 3 integrally superposed on the substrate 1 has flow paths 4 provided at locations corresponding to the energy generating members 2. The individual flow paths 4 have their cross-section gradually decreased so as to be tapered from a recording liquid chamber 5 toward orificies 6.

The energy generating members 2 are electrically connected to an electrode, not shown, for supplying an energizing signal, and liquid can be discharged from the orifices 6 in response to the energizing signal.

In constructing such a liquid jet recording head, a photosensitive material, for example, a photo-sensitive resin setting film, is first formed on the substrate 1 of the material as mentioned above by an appropriate method such as the laminate method, whereafter as is usually done, recording liquid path wall portions 3A and liquid chamber wall portions 3B are formed by a photolithography technique or the like.

Subsequently, small walls 10 are provided on that side of the flow paths 4 which is adjacent to the recording liquid chamber 5. These small walls 10 may be formed by the use of a photolithography technique when the liquid path walls 3A, 3B etc. are formed.

Subsequently, an upper lid portion 3C may be joined, whereby there can be provided a unitary recording head provided with the liquid paths 4 and the recording liquid chamber 5. In FIG. 1, the portion joined to the upper lid portion 3C is not shown. Thus, the use of the photosensitive material makes high-density minute machining easy and simple, and high-density multi-orifice recording heads having an excellent performance can be mass-produced at low cost and with a good yield.

The recording operation of the liquid jet recording head thus constructed will now be described. Recording liquid directed into the recording head by supply means, not shown, fills the recording liquid chamber 5 and flow paths 4 and forms a meniscus at the orifices 6 by the surface tension of the liquid itself. So, when an energizing signal is supplied to the energy generating members 2 provided on the substrate 1, a sudden discharge energy is applied to the recording liquid, whereby liquid droplets are discharged from the orifices 6, and by this discharge of the recording liquid, a greatly concavely retracted meniscus is formed at the orifices 6 and the liquid paths 4 in these portions are immediately refilled with the recording liquid directed from the recording liquid chamber 5, by the surface tension thereof. That is, the physical phenomenon of the meniscus formed in this condition greatly acts on such liquid refilling operation due to the liquid paths 4 to the orifices 6 being tapered, and where the area of the orifices 6 and the length of the liquid path 4 are made constant, the cross-sectional area of the liquid paths 4 is made greater from the orifices 6 toward the recording liquid chamber, whereby the recording liquid refill becomes easier and is completed within a short time.

The maximum repetition frequency of liquid droplet discharge is controlled by the time T required for the refill, and shortening the time T is effective to enhance the maximum frequency. To shorten the refill time T, the liquid resistance in the liquid paths 4 may be reduced. Specifically, a method of shortening the length L of the liquid paths 4 or increasing the cross-sectional area of the liquid paths 4 is conceivable.

However, if the length L of the liquid paths 4 is shortened, the loss of the discharge energy to the liquid chamber 5 side will increase and therefore, the flying speed of liquid droplets will become low and unstable. Also, if the cross-sectional area of the liquid paths 4 is increased, the rate at which the discharge energy is utilized for liquid droplet discharge will become small and therefore, the flying speed of liquid dorplets will become low and unstable. So, to effectively shorten the time T, the liquid path resistance between the energy generating members 2 in the liquid paths 4 and the liquid chamber 5 may be reduced and thus, it is not necessary to increase the cross-sectional area of the liquid paths between the orifices 6 and the energy generating members 2. Also, increasing the cross-sectional area of the liquid paths between the energy generating members 2 and the liquid chamber 5 is conceivable, but this is not preferable because stagnation is created in the flow of the recording liquid and distrubance of the flow is caused during the refill. So, as shown in the present embodiment, by successively diminishing the cross-sectional area of the liquid paths 4 at a predetermined rate of successive diminution from the liquid chamber 5 side toward the orifices 6, the refill time T can be shortened without causing any distrurbance of the flow of the recording liquid during the refill and further, the loss of the pressure force can be reduced. Now, let it be assumbed in FIG. 1 that the cross-sectional area at the orifices 6 is $S_1$, the cross-sectional area of the flow paths 4 at the end of the energy generating members 2 which is adjacent to the liquid chamber 5 is $S_2$, the ratio $S_2/S_1=r$, the length of the flow paths is $L_1$, and the length of the liquid paths from the orifices 6 to the rear end of the energy generating members is $L_2$.

Figure 2:
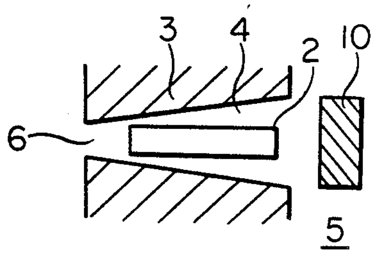
FIGS. 2 and 3 are fragmentary cross-sectional views of flow paths according to embodiments of the present invention.
Figure 3:
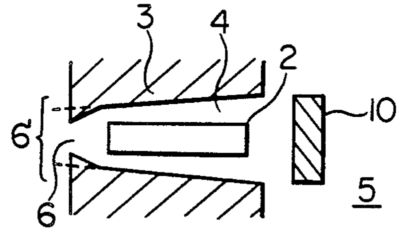

FIGS. 2 and 3 show the relative positional relations between the energy generating member in a liquid path 4 and the orifices 10 and the small walls 10.

FIG. 3 shows another embodiment of the present invention. This embodiment is characterized in that the rate of successive diminution of the cross-sectional area of the liquid paths 4 is increased near the orifices. In this case, the cross-sectional area $S_1$ of the orifice portion concerned with the cross-sectional area ratio r is defined by the cross-sectional area at a location indicated by 6' in FIG. 3. By thus partly increasing the rate of successive diminution, the direction of flight of the recording liquid droplets becomes more stable and the flying speed becomes greater, so that more uniform printing can be realized.

By the provision of the small walls 10, the loss of the discharge energy applied from the energy generating members 2 to the recording liquid and escaping toward the liquid chamber 5 can be successively diminished, whereby discharge can be further stabilized. The small walls 10 are directed to the effective utilization of the discharge energy and the size and shape thereof may be any ones which will fit such a purpose. Also, in these embodiments, the small walls 10 are provided in the recording liquid chamber 5, but alternatively, they may be provided in the liquid paths 4. Of course, such small walls 10 can be formed simultaneously with the formation of the liquid path walls and the recording liquid chamber walls by using, for example, a photosensitive material.

Figure 4:
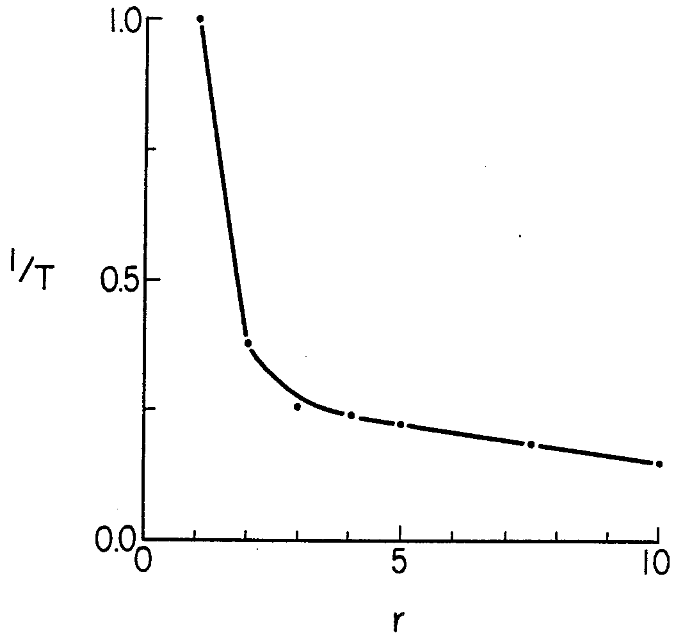
FIG. 4 is a graph showing the relation between the refill time and the ratio of the cross-sectional areas of the flow paths for liquid droplet discharge repetition confirmed by an experiment on the liquid jet recording head of the present invention.

The applicant carried out an experiment to make such liquid paths 4 into a throttle shape. The result of the experiment is shown in FIG. 4 and was obtained with respect to the variation in refill time tr at values of r no less than one and no greater than 10. The refill time T is shown normalized by the value of the time tr when r=1. It becomes apparent that a great effect in shortening the time tr is obtained by making the ratio r as shown in FIG. 4 greater than 1.0. The greater the ratio r, the shorter is the time tr, but the rate of the effect becomes gradually smaller. There is also a tendency that the greater the ratio r, the lower and more unstable is the flying speed of liquid droplets, and as a result of repeated experiments, it has been confirmed that no practical hindrance occurs when r is in the range of no less then one and no greater than five.

Figure 5:
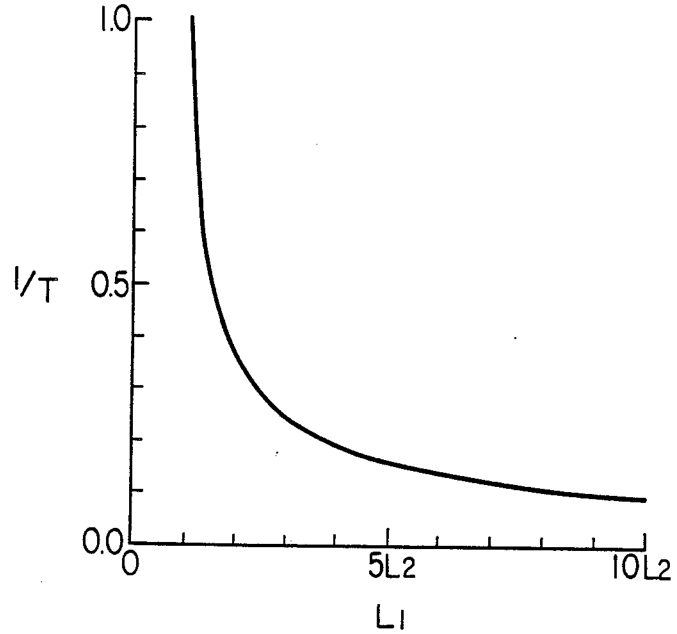
FIGS. 5 and 6 are graphs showing the relation between the length of the flow paths and the normalized fill time confirmed by an experiment of the liquid jet recording head on the present invention and the relation between the ratio of the cross-sectional areas of the flow paths and the normalized fill time.

Also, as regards the relation between the lengths $L_1$ and $L_2$ in the liquid paths 4, if the length $L_1$ of the entire liquid path is relatively short, the normalized fill time T (this time T being a time obtained by normalizing the fill time tr when $L_2 \leqq L_1$ with the fill time when $L_1=L_2$ as 1) can be shortened as shown in FIG. 5, and the effect is great particularly when $L_1$ is no less than $L_2$ and no greater than $5L_2$. On the other hand, as $L_1$ is made shorter, the loss of the discharge energy of the energy generating members toward the liquid chamber increases and thus, the flying speed of liquid droplets becomes lower and unstable, thereby disturbing printing which is a practical problem. So, it has been empirically observed that by installing the small walls 10 within an area rearward of the energy generating members of $L_2$ to $3L_2$, disturbance of printing which poses a problem even when $L_1=L_2$ does not occur. It should be noted that $L_1<L_2$ is undesirable because it greatly increases the loss of the discharge energy of the energy generating members 2 escaping to the liquid chamber 5.

Figure 6:
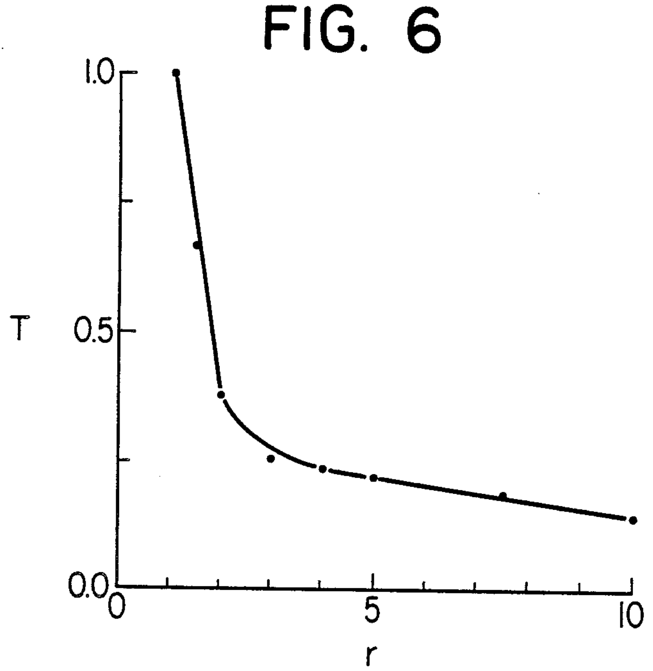

Further, $r>1$ can shorten the normalized fill time T much more. FIG. 6 shows the relation with the time T when r is no less than one and no greater than 10, and $r>1$ greatly shortens the time T. As the ratio r is increased, the cross-sectional area of the flow paths in the portion wherein the energy generating members 2 are located increases and therefore, the rate at which the discharge energy is utilized for the flight of liquid droplets decreases, and this leads to a reduction in and instability of the flying speed. In contrast, installation of the small walls 10 is effective.

As a result of the measurement cautiously repeated in the experiment, the applicant has confirmed that if the length $L_1$ of the liquid paths 4 is no less than $L_2$ and no greater than $5.0L_2$ and the ratio r of the cross-sectional areas thereof is greater than 1.0 and no greater than 5.0 and the small walls 10 are n the area at the distance $L_2$ to $3L_2$ in the liquid paths 4 or the liquid chamber 5 rearward of the energy generating members 2, disturbance of printing which poses a practical problem is not caused and flying does not become unstable. As is evident from FIG. 6, $r>5$ is less effective to shorten the time T.

According to the present invention, as described above, the recording liquid supplying efficiency can be improved and the liquid droplet discharge repetititon frequency can be enhanced by a simple structure in which the cross-sectional area of the liquid paths is gradually decreased toward the orifices. By the small walls for preventing backflow of the liquid during the discharge of the liquid being installed rearwardly of the energy generating members, more stable liquid discharge can be accomplished.

The use of a heat energy generating member as an energy generating member of a recording head according to the present invention is preferable in high density recording and high quality recording. Especially the use of the electro-thermal converting member as the energy generating member is preferable for the realization of the objects of the present invention and the fabrication of a recording head.

What I claim is:

1. A liquid jet recording head comprising:

a body having a plurality of orifice portions ending in orifices for discharging liquid droplets therefrom and a plurality of liquid flow paths therein through which liquid is adapted to flow;

a chamber for retaining liquid therein, wherein said plurality of liquid flow paths connect said orifices to said chamber, and wherein the cross-sectional are of each of said flow paths continuously decreases from said chamber to said orifices;

energy generating means provided in said plurality of liquid flow paths for generating energy to be imparted to the liquid; and a plurality of members disposed in said chamber to provide walls upstream of said energy generating means, wherein:

the area of any said liquid flow path at said orifice portion is defined as $S_1$, the area of said liquid flow path at said chamber is defined as $S_2$, and the ratio $S_2/S_1$ is greater than one and no greater than five, the length of any said liquid flow path from said orifice to said chamber is defined as $L_1$, the distance between said orifice and the end of said energy generating means proximate to said chamber is defined as $L_2$, and the ratio $L_1/L_2$ is no less than one and no greater than five, and the distance from said orifices to said members is no greater than $3L_2$.

2. A liquid jet recording head according claim 1, wherein said body on which said plurality of flow paths and said plurality of members are formed of a photosensitive material.

3. A liquid jet recording head according to claim 1, wherein the area of any said liquid flow path decreases from said orifice portion to said orifice at a rate faster than the rate of decrease from said chamber to said orifice portion, and $S_1$ is defined as the area of said liquid flow path where the faster rate of decrease begins.

4. A liquid jet recording head according to claim 1, wherein each of said members comprises a separate wall upstream of each of said energy generating means.

5. A liquid jet recording head according to claim 1, wherein said energy generating means utilize thermal energy to eject droplets of recording liquid for producing images.

6. A liquid jet recording head according to claim 1, wherein the sides of a liquid flow path are substantially straight and $S_1$ is defined as the area of said orifice.

7. A liquid jet recording apparatus having a liquid jet recording head comprising:

a body having a plurality of orifice portions ending in orifices for discharging liquid droplets therefrom and a plurality of liquid flow paths therein through which liquid is adapted to flow;

a chamber for retaining liquid therein, wherein said plurality of liquid flow paths connect said orifices to said chamber, and wherein the cross-sectional area of each of said flow paths continuously decreases from said chamber to said orifices;

energy generating means provided in said plurality of liquid flow paths for generating energy to be imparted to the liquid; and a plurality of members disposed in said chamber to provide walls upstream of said energy generating means, wherein:

the area of any said liquid flow path at said orifice portion is defined as $S_1$, the area of said liquid flow path at said chamber is defined as $S_2$, and the ratio $S_2/S_1$ is greater than one and no greater than five, the length of any said liquid flow path from said orifice to said chamber is defined as $L_1$, the distance between said orifice and the end of said energy generating means proximate to said chamber is defined as $L_2$, and the ratio $L_1/L_2$ is no less than one and no greater than five, and the distance from said orifices to said members is no greater than $3L_2$.

* * * * *